United States Patent
Sarkar et al.

(10) Patent No.: US 8,014,331 B2
(45) Date of Patent: Sep. 6, 2011

(54) METHOD AND APPARATUS FOR USING A MAC PROTOCOL FOR BROADCAST

(75) Inventors: Sandip Sarkar, San Diego, CA (US);
Naga Bhushan, San Diego, CA (US);
Tamer Kadous, San Diego, CA (US);
Aamod Khandekar, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 774 days.

(21) Appl. No.: 12/056,033

(22) Filed: Mar. 26, 2008

(65) Prior Publication Data

US 2008/0261582 A1 Oct. 23, 2008

Related U.S. Application Data

(63) Continuation-in-part of application No. 11/829,750, filed on Jul. 27, 2007, now abandoned.

(51) Int. Cl.
*H04H 20/71* (2008.01)
(52) U.S. Cl. ........................................ 370/312; 370/496
(58) Field of Classification Search .................. None
See application file for complete search history.

(56) References Cited

U.S. PATENT DOCUMENTS

| | | | |
|---|---|---|---|
| 7,577,128 B2 | 8/2009 | Khan | |
| 7,653,027 B2 | 1/2010 | Kim et al. | |
| 2005/0075124 A1* | 4/2005 | Willenegger et al. | 455/522 |
| 2005/0152297 A1* | 7/2005 | Lee | 370/312 |
| 2005/0193309 A1* | 9/2005 | Grilli et al. | 714/752 |
| 2006/0189272 A1* | 8/2006 | Willenegger et al. | 455/3.01 |
| 2006/0189300 A1* | 8/2006 | Hwang et al. | 455/412.2 |
| 2007/0129062 A1 | 6/2007 | Pantalone et al. | |
| 2008/0025241 A1* | 1/2008 | Bhushan et al. | 370/312 |
| 2008/0056387 A1* | 3/2008 | Sakar et al. | 375/240.27 |
| 2008/0101326 A1* | 5/2008 | Zhang et al. | 370/345 |
| 2008/0151805 A1* | 6/2008 | Vayanos et al. | 370/312 |
| 2008/0232294 A1* | 9/2008 | Ulupinar et al. | 370/312 |
| 2009/0022097 A1* | 1/2009 | Yoon et al. | 370/329 |

(Continued)

FOREIGN PATENT DOCUMENTS

CN 1734979 A 2/2006

(Continued)

OTHER PUBLICATIONS

LGE, Motorola, Qualcomm, Inc., Samsung: "BCMS in LBC" C30-20070212-014, Feb. 12, 2006, pp. 1-37.

(Continued)

*Primary Examiner* — Anh-Vu Ly
(74) *Attorney, Agent, or Firm* — Donald Charles Kordich; John J. Ketchum

(57) ABSTRACT

Method and apparatus that provide for broadcast multicast services in an ultra mobile broadband network are disclosed. A broadcast transmission structure provides for efficient indexing of subbands reserved for BCMCS. Transmissions on the logical channels are segmented into error control blocks beginning with zero or one MAC packet received by a MAC layer. A transmitting entity appends parameters relating to content change within a next ultraframe at end of every broadcast packet that is not a stuffing packet. A mapping message of multiple Physical Layer groups addresses a single logical channel when SFN (Single Frequency Network) coverage of an associated subband group is different from SFN coverage of the logical channel.

27 Claims, 10 Drawing Sheets

U.S. PATENT DOCUMENTS

| | | | |
|---|---|---|---|
| 2009/0022234 A1 | 1/2009 | Wang et al. | |
| 2009/0046612 A1 | 2/2009 | Kyung et al. | |
| 2009/0296631 A1 | 12/2009 | Takahashi et al. | |
| 2010/0172279 A1* | 7/2010 | Chen et al. | 370/312 |

FOREIGN PATENT DOCUMENTS

| | | |
|---|---|---|
| WO | WO2005027566 | 3/2005 |
| WO | WO2005122458 | 12/2005 |
| WO | WO2008014511 | 1/2008 |

OTHER PUBLICATIONS

3GPP2 C.S0054, Version 1.0, "CDMA2000 High Rate Broadcast-Multicast Packet Data Air Interface Specification," (Feb. 2004).

3GPP2 C.S0084-001-0 v1.0, Physical Layer for Ultra Mobile Broadband (UMB) Air Interface Specification, Apr. 5, 2007.

3GPP2 C.S0084-009-0, Version 2.0, "Broadcast-Multicast Upper Layer for Ultra Mobile Broadband (UMB) Air Interface Specification," (Aug. 2007).

3GPP2: "CDMA2000 High Rate Broadcast-Multicast Packet Data Air Interface Specification", C.S0054-0 Version 1.0, Feb. 2004. Chapters 1.4.2, 1.4.3 and 2.4.7.4.1.1.

3GPP2: "C.S0084-009-0, Version 2.0, Broadcast-Multicast Upper Layer for Ultra Mobile Broadband (UMB) Air Interface Specification" Internet Citation, [Online] XP002462007 Retrieved from the Internet: URL:http://www.3gpp2.org/Publi c_html/specs/C.S0084-009-0_v2.0_070904.pdf> [retrieved on Dec. 11, 2007] pp. 2-1-pp. 2-18 pp. 2-58-pp. 2-59 pp. 2-40-pp. 2-41.

International Search Report and Written Opinion—PCT/US2009/038390, International Search Authority—European Patent Office—Jan. 12, 2009.

Lge et al: "BCMCS in LBC" Internet Citation, [Online] XP002462005 Retrieved from the Internet: URL:http://www.3gcn.org/3gpp2/TSGC/Worki ng /2007-02-Seoul/TSG-C-2007-02-Seoul/WG3/C30-20070212-014_BCMCS.pdf> [retrieved on Dec. 11, 2007] pp. 17-24.

Lge, Motorola, Qualcomm Incorporated, Samsung: "BCMCS in LBC", C30-20070212-014, Feb. 12, 2006, pp. 1-37.Y pp. 1, 2, 17-19 and 21.

* cited by examiner

| Field | Length (bits) |
|---|---|
| MessageID | 8 |
| ProtocolSubtype | 16 |
| BroadcastParametersSignature | 16 |
| CompleteListInd | 1 |
| QCISignature | 20 |
| AllReservedInterlaces | 1 |
| BCMCSReservedInterlaces | 0 or 4 |
| RotationalAngleIncluded | 1 |
| RotationalAngle | 0 or 4 |
| NumBOC | 2 |
| BCMCSFlowIDLength | 2 |
| BCMCSOverheadFields | Variable lenght |
| Reserved | 0-7 (as needed) |

FIG. 4A

| Value | BCMCS Reserved interlaces |
|---|---|
| 0000 | 0 |
| 0001 | 0, 1 |
| 0010 | 0, 1, 2 |
| 0011 | 0, 1, 2, 3 |
| 0100 | 0, 1, 2, 3, 4 |
| 0101 | 0, 1, 2, 3, 4, 5 |
| 0110 | 0, 1, 2, 3, 4, 5, 6 |
| 0111 | 3 |
| 1000 | 6 |
| 1001 | 0, 2 |
| 1010 | 0, 4 |
| 1011 | 0, 6 |
| 1100 | 2, 4 |
| 1101 | 2, 6 |
| 1110 | 4, 6 |
| 1111 | 2, 4, 6 |

FIG. 4B

Format of the Broadcast MAC Packets

Format of the Last Broadcast MAC Packet that is not a Stuffing Packet

| Field | Length (Bits) |
|---|---|
| StartBCMCSSubbandNumber | 8 |
| EndBCMCSSubbandNumber | 8 |
| Read BroadcastParameters | 1 |
| Reserved | 7 |

METHOD AND APPARATUS FOR USING A MAC PROTOCOL FOR BROADCAST

CROSS-REFERENCE TO RELATED APPLICATION(S)

This application is a continuation-in-part of co-pending U.S. Utility application Ser. No. 11/829,750 filed on Jul. 27, 2007 and entitled "METHOD AND APPARATUS FOR BROADCAST MULTICAST SERVICE IN AN ULTRA MOBILE BROADBAND NETWORK" which claims priority to U.S. Provisional Application Ser. No. 60/833,940 filed on Jul. 28, 2006 entitled "BCMCS IN UHDR-ONE", the entire disclosures of which are incorporated herein by reference.

BACKGROUND OF THE INVENTION

Wireless communication systems are widely deployed to provide various types of communication content, such as, voice, media, data, and so on. These systems may be multiple-access systems capable of supporting communication with multiple users by sharing available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can concurrently support communication for multiple wireless terminals. Each terminal communicates with one or more base stations via transmissions on forward and reverse links. The forward link (or downlink) refers to a communication link from base stations to terminals, and the reverse link (or uplink) refers to a communication link from terminals to base stations. This communication link may be established via one or more of single-in-single-out (SISO), multiple-in-single-out (MISO) or multiple-in-multiple-out (MIMO) systems.

A wireless communication system can also be employed to provide various types of services. These services include point-to-point services, or dedicated services such as voice and packet data, whereby data is transmitted from a transmission source (e.g., a base station) to a specific recipient terminal such as in cellular telephony or Internet communications. In addition to these services, several providers have launched mobile multimedia services closely resembling traditional broadcast services such as radio, television etc. Such services push content aggregated into channels to subscribers. In some cases, the content may be taken from, for example, existing TV channels or it may be other special content.

If the point-to-point model of communications is employed for such mobile multimedia services the content server that delivers content to the users must establish and maintain a separate point-to-point connection for each recipient. While this approach may be adequate for low to moderate number of subscribers it does not scale well as the number of subscribers increases. Thus, the characteristics and requirements for point to multipoint transmissions such as multimedia services or broadcast services are very different in many aspects from those for more dedicated services such as cellular telephony. For example, dedicated resources (e.g., physical channels) are allocated to individual terminals for dedicated services. In contrast, common resources may be allocated and used for all terminals expected to receive the broadcast services. Moreover, the transmission for a broadcast service would need to be controlled such that a large number of terminals with different individual attributes are able to reliably receive the service, while optimizing the resources required for implementing the service. Hence, techniques to implement such broadcast services efficiently in a wireless communication system need to be explored that allow reservation of bandwidth for broadcast services, operating flexibility depending on broadcast/multicast loads, fast switching time, and minimal wake up time for access terminals thus improving battery efficiency.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method of transmitting broadcast content in a wireless communication system wherein broadcast transmissions are indexed in terms of ultraframes. Information regarding physical location of one or more logical channels is provided. A number of physical channels are grouped into one or more subband groups which are further partitioned into outerframes. The outerframes have subbands transmitting broadcast content associated therewith. The location of the logical channels is advertised to UEs receiving the broadcast content via signaling such as a parameters message.

In accordance with an aspect, transmissions on the logical channels are segmented into error control blocks (ECBs) beginning with zero or one MAC packet received by a MAC layer. Data is filled into the error control blocks, Reed-Salomon coding is applied along columns of the error control blocks and they are subsequently sent in rows. In a further aspect, information regarding logical channels transmitted on ultraframe k+1 within a subband group is appended to packets transmitted on a previously transmitted ultraframe k where k is any positive integer. A transmitting entity appends one or more parameters at the end of every broadcast packet that is not a stuffing packet. In a more detailed aspect, the parameters transmitted can be one or more of StartBCMCSSubbandNumber, EndBCMCSSubbandNumber or Read BroadcastParameters. In a further aspect, Read BroadcastParameters is set to a value of '1' to indicate a change in the next instance of the parameters message else the value of the Read BroadcastParameters is set to '0' to indicate that there is no change.

Another aspect relates to sending a mapping message to a UE. This provides the UE with the mapping between the logical channels and a starting subband. The mapping message of multiple Physical Layer groups addresses a single logical channel when SFN (Single Frequency Network) coverage of the subband is different from SFN coverage of the associated logical channel.

Another aspect relates to a method of receiving broadcast content that saves battery life. A broadcast packet with information regarding a next ultraframe appended therewith is received at a user equipment (UE). The received packet is then decoded to determine if there is content change in the next ultraframe. Based upon the decoding results, the user equipment can continue to operate in sleep mode if the decoding indicates that there is no content change in the next ultraframe thus saving battery life. If the decoding indicates a content change in the next ultraframe, location of the content change within that ultraframe can also be obtained from the appended parameters.

Another aspect relates to an apparatus for transmitting broadcast content within a wireless transmission system. The apparatus comprises a processor that maps physical location of one or more logical channels within the broadcast transmission wherein a plurality of physical channels are classified into one or more subband groups. The apparatus also comprises a transmitter that transmits the broadcast content indexed as ultraframes. The mapping is associated with at least one of the subband groups which are further partitioned into outerframes. These outerframes are associated with one or more subbands transmitting the broadcast content.

An apparatus for receiving broadcast content is disclosed in accordance with yet another aspect. It comprises a receiver that receives one or more broadcast packets on a current ultraframe. At least one of the received packets has information regarding any content changes in the next ultraframe appended therewith. A processor, also comprised within the apparatus, decodes the next ultraframe data appended to the received packet(s) to determine if there is a change in any of the parameters associated with the next ultraframe. In accordance with a more detailed aspect, the processor operates the apparatus in a sleep mode upon a determination that there is no change in the parameters associated with the next ultraframe while it determines a location of a content change upon decoding that the parameters associated with the next ultraframe have changed.

In yet another aspect, a computer readable medium having stored thereon computer executable instructions for carrying out various acts associated with transmitting broadcast content within a wireless transmission system is disclosed. The medium comprises instructions for indexing broadcast transmissions as one or more ultraframes. The instructions also include a mapping that provides information regarding physical location of logical channels within the transmissions. A number of physical channels are classified into a subband group wherein the subband group is further divided into outerframes. The outerframes with one or more subbands associated therewith are transmitted in accordance with the stored instructions.

Another aspect relates to an apparatus for facilitating broadcasting within a communication system. This apparatus comprises means for indexing the transmissions as one or more ultraframes. A plurality of physical channels are classified into at least one subband group that is further partitioned into outerframes. The apparatus also comprises means for transmitting the outerframes with one or more subbands associated therewith.

In yet another aspect, a computer readable medium having stored thereon computer executable instructions for receiving broadcast content is disclosed. It comprises instructions for receiving a broadcast packet with information regarding a next ultraframe appended therewith. The instructions also facilitate decoding the received packet to obtain the information related to the next ultraframe and determining if there is content change in the next ultraframe.

An apparatus for receiving broadcast transmissions is disclosed in accordance with an aspect. The apparatus comprises means for receiving a broadcast packet with information regarding a next ultraframe appended therewith. It also comprises means for decoding the received packet to obtain the information and determining if there is content change in the next ultraframe based on the decoding.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIG. 4A is a schematic diagram of an embodiment of a signaling message conveying information regarding broadcast parameters to UEs transmitted in accordance with an aspect.

FIG. 4B illustrates a tabular form with values selected by an access network for BCMCSReservedInterlaces within the BroadcastParameters message in accordance with an aspect.

FIG. 6B shows a tabular form of the details of the MAC packet containing the trailer NextUltraframeInfo in accordance with an aspect.

DETAILED DESCRIPTION

Figure 1:
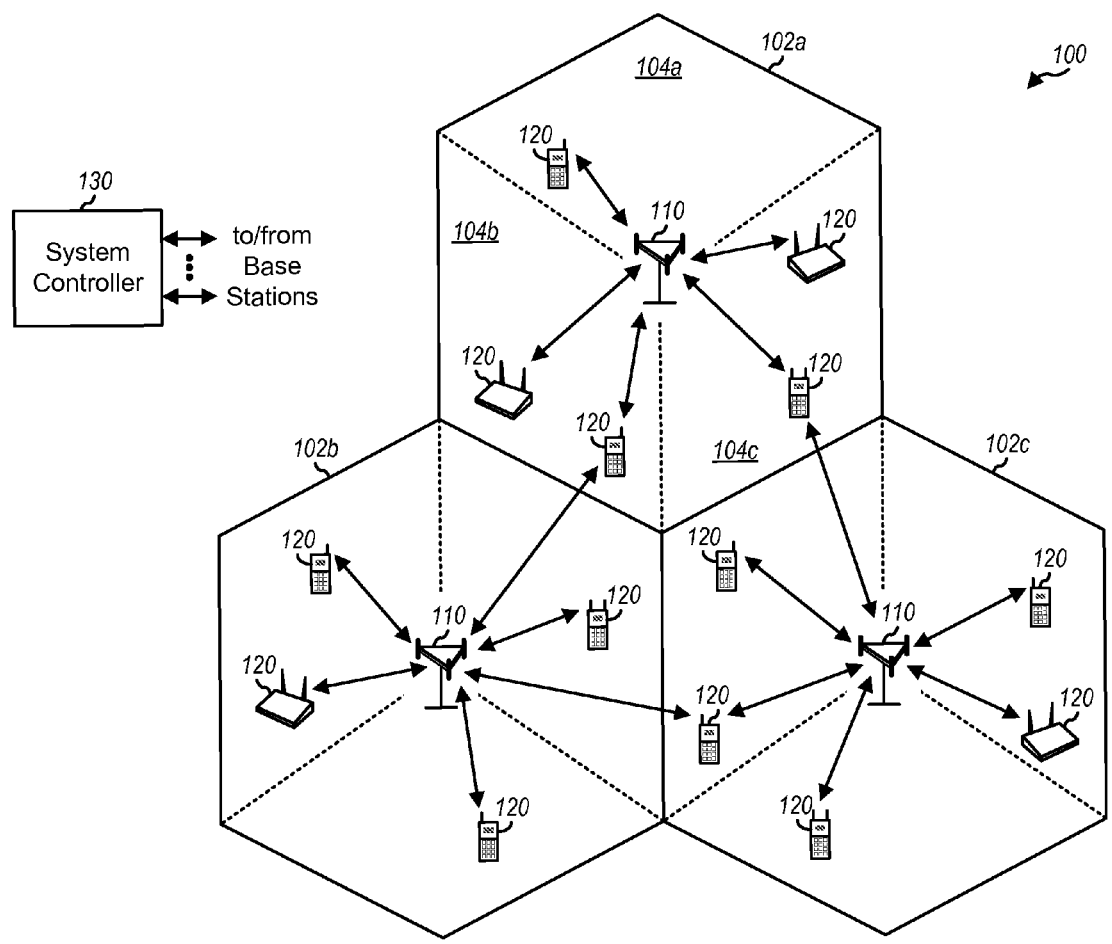
FIG. 1 is an illustration of a wireless multiple-access communication system in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, UE, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as CDMA, TDMA, FDMA, OFDMA, SC-FDMA (single carrier FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 (Interim Standard 95) and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Institute of Electrical and Electronics Engineers) (Wi-Fi), IEEE 802.16 (WiMAX) (Worldwide Interoperability for Microwave Access), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE, EPS (Enhanced Packet System) for LTE and GSM are described in documents from an organization named "3rd Generation Partnership Project" (3GPP). CDMA2000 and UMB are described in documents from an organization named "3rd Generation Partnership Project 2" (3GPP2).

Referring now to the drawings, FIG. 1 is an illustration of a wireless multiple-access communication system 100 in accordance with various aspects. In one example, the wireless multiple-access communication system 100 includes multiple access points (APs) 110 and multiple access terminals (ATs) 120. A base station may also be called, an access point, a Node B, and/or some other network entity and may contain some or all of the functionality of the aforementioned entities. Each access point 110 provides communication coverage for a particular geographic area 102 (e.g. 102a, 102b, 102c). The term "cell" can refer to an access point and/or its coverage area depending on the context in which the term is used. To improve system capacity, an access terminal coverage area may be partitioned into multiple smaller areas, e.g., three smaller areas 104a, 104b, and 104c. Each smaller area is served by a respective base transceiver subsystem (BTS). The term "sector" can refer to an AP and/or its coverage area depending on the context in which the term is used. For a sectorized cell, the APs for all sectors of that cell are typically co-located within the base station for the cell. The signaling transmission techniques described herein may be used for a system with sectorized cells as well as a system with un-sectorized cells. For simplicity, in the following description, the term "base station" is used generically for a station that serves a sector as well as a station that serves a cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 130 couples to APs 110 and provides coordination and control for these base stations. System controller 130 may be a single network entity or a collection of network entities. For a distributed architecture, the APs may communicate with one another as needed.

Figure 2:
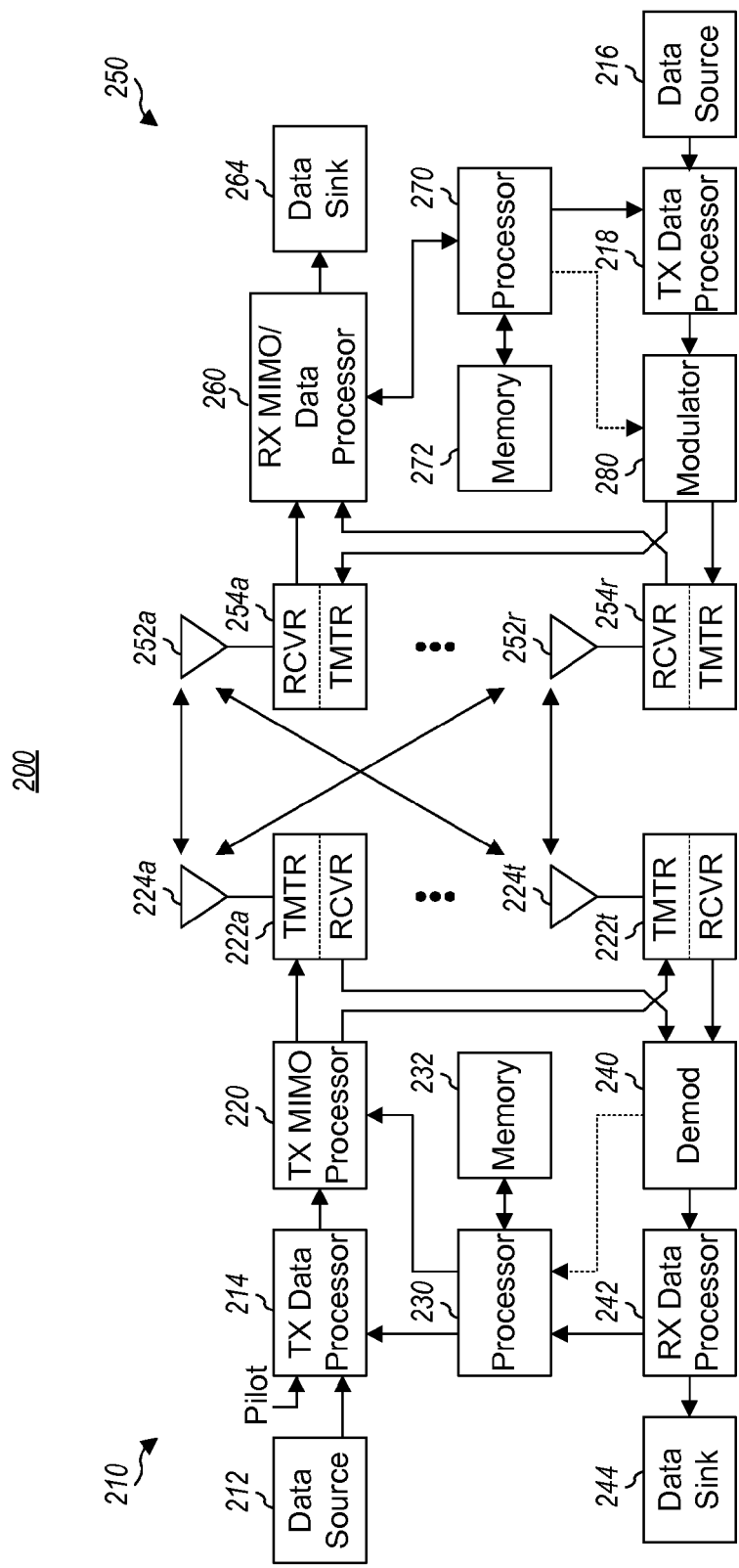
FIG. 2 is a block diagram of an embodiment of a transmitter system and a receiver system in a MIMO system.

Referring to FIG. 2, a block diagram of an embodiment of a transmitter system 210 and a receiver system 250 in a MIMO system 200 is illustrated. At transmitter system 210, traffic data for a number of data streams is provided from a data source 212 to transmit (TX) data processor 214. In an embodiment, Ns data streams are transmitted over $N_T$ transmit antennas. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK (binary phase shift keying), QSPK (quadrature phase shift keying), M-PSK (multi-phase shift keying), or M-QAM (multi-level quadrature amplitude modulation) selected for that data stream to provide modulation symbols. The data rate, coding, and modulation for each data stream may be determined by instructions provided by processor 230.

The modulation symbols for data streams are then provided to a TX processor 220, which may further process the modulation symbols (e.g., for OFDM). TX processor 220 then provides $N_T$ modulation symbol streams to $N_T$ transceivers (TMTR) 222a through 222t. Respective transceivers 222 receive and process a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective transceiver 254. Each transceiver 254a-254r conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ transceivers 254 based on a particular transceiver processing technique to provide $N_S$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 218 is complementary to that performed by TX processor 220 and TX data processor 214 at transmitter system 210.

RX processor 260 may derive an estimate of the channel response between the $N_T$ transmit and $N_R$ receive antennas, e.g., based on the pilot information multiplexed with the traffic data. RX processor 260 may identify the pilot symbols according to pilot patterns stored in memory, e.g., memory 272 that identify the frequency subcarrier and symbol period assigned to each pilot symbol. In addition, the user specific and/or sector specific scrambling sequences may be stored in memory so that they may be utilized by RX processor 260 to multiple the received symbols so that the proper decoding can occur.

To decode the pilot and data symbols, the RX processor 260 and processor 270 may separately extract the pilot symbols from each sector and associated data symbols. The RX data processor 260 then processes the data symbol estimates and provides decoded data to a data sink 264 and signaling to a controller/processor 270. In accordance with some embodiments the scrambling can be based on the SFN zone that may define the geographic areas over which the transmission is made.

The channel response estimate generated by RX processor 260 can be used to perform space, space/time processing at the receiver, adjust power levels, change modulation rates or schemes, or other actions. RX processor 260 can further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Data from a data source 216 is then processed by a TX data processor 218, modulated by a modulator 280, conditioned by transceivers 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to provide decoded data to data sink 244.

Processors 230 and 270 direct operation at the transmitter and receiver systems, respectively. Memories 232 and 272 provide storage for program codes and data used by processors 230 and 270, respectively. The memories 232 and 272 store the pilot patterns in terms of cluster locations, and/or scrambling sequences, if utilized. Processors 230 and 270 then can select which of the pilot patterns, and/or scrambling sequences are to be utilized in transmission of the pilot symbols.

Techniques are described herein to implement broadcast and multi-cast services (BCMCS) in a wireless communication system. BCMCS comprises point-to-multipoint communication services that attempt to deliver certain content to a large number of UEs (broadcast) and services that attempt to deliver certain content to a specific group of UEs (multicast) over an OTA (Over The Air)/IP (Internet Protocol) network. This service may allow users to receive variety of content (e.g., video/text) on their handsets over cellular links using an Ultra Mobile Broadband (UMB) system. The design considerations for BCMCS are different from those for point-to-point communication services (such as voice and packet data), which are commonly provided by cellular communication systems. Various considerations and design features for broadcast and multi-cast services within a UMB system are described in detail below.

An aspect disclosed herein relates to reserving bandwidth within a wireless communication system for BCMCS. The symbol streams are then transmitted and received over channels that can include both physical and logical channels wherein physical channels are the frequencies carrying communications and logical channels are schematic partitions created on these frequencies based on the tasks to be performed. A single physical channel may hence be divided into one or more logical channels. In other words, logical channels are different names assigned to the physical frequencies based on the tasks involved.

The logical channels within a communication system providing BCMCS are classified into control channels and traffic channels. Logical Control Channels can comprise among other channels the following channels transmitting from an access point (AP) to a UE. These can include, Broadcast Control Channel (BCCH) for broadcasting system control information, Multicast Control Channel (MCCH) which is a point-to-multipoint channel used for transmitting Multimedia Broadcast and Multicast Service (MBMS) scheduling and control information for one or several Multicast Traffic Channels (MTCH). Generally, after establishing RRC (Radio Resource Control) connection this channel is only used by UEs that receive MBMS (Note: old MCCH (MBMS control channel)+MSCH (multicast signaling channel)). In an aspect, Logical Traffic Channels can comprise a Multicast Traffic Channel (MTCH) is used for transmitting traffic data over a point-to-multipoint down link channel.

In an aspect, transport channels are classified into downlink channels which carry traffic from an AP to a UE and uplink traffic channels that carry traffic in the opposite direction from a UE to an AP. Down link Transport Channels comprise a Broadcast Channel (BCH), Downlink Shared Data Channel (DL-SDCH) and a Paging Channel (PCH), the PCH is broadcasted over entire cell and mapped to PHY resources which can be used for other control/traffic channels to save power for UE. The UL Transport Channels comprise a Random Access Channel (RACH), a Request Channel (REQCH), a Uplink Shared Data Channel (UL-SDCH) and plurality of PHY channels.

The PHY channels comprise a set of DL channels that can comprise a Forward Broadcast and Multicast Pilot Channel for phase reference, a Forward Broadcast and Multicast Services Channel for transmission of BCMCS data. A Forward Data Channel (F-DCH) can be user to obtain system messages such as the BPM (Broadcast Parameters Message) for which a user can listen to unicast synchronization channels although the transmission times of BPM may be a system parameter. The downlink physical channels can include the following channels: Common Pilot Channel (CPICH); Synchronization Channel (SCH); Common Control Channel (CCCH); Shared Downlink (DL) Control Channel (SDCCH); Multicast Control Channel (MCCH), Shared Uplink (UL) Assignment Channel (SUACH); Acknowledgement Channel (ACKCH); Downlink (DL) Physical Shared Data Channel (DL-PSDCH).

Figure 3A:
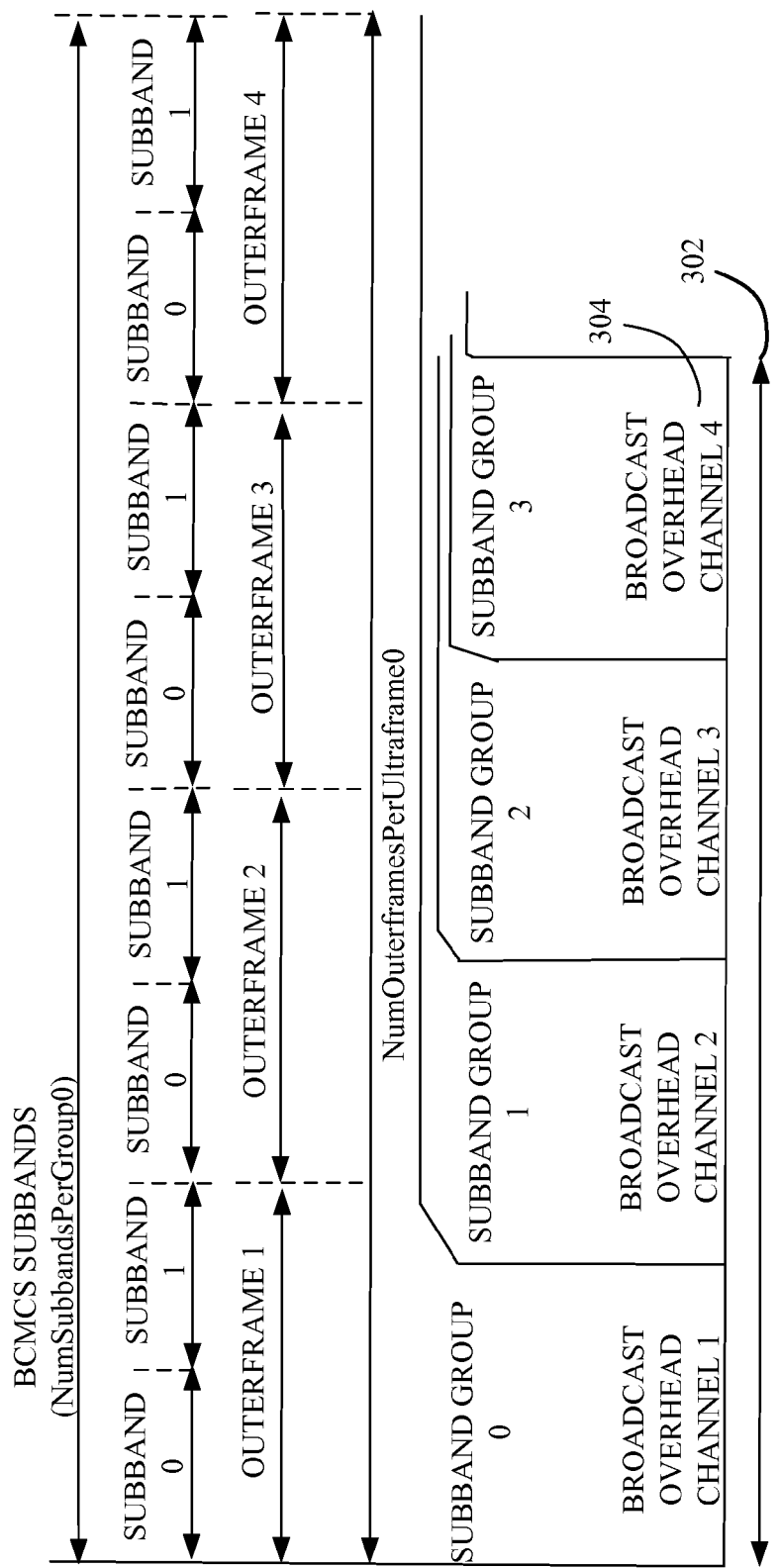
FIG. 3A relates to an aspect associated with indexing of subbands employed for BCMCS in a UMB system.

FIG. 3A relates to an aspect associated with indexing of subbands employed for BCMCS in a UMB system. Each ultraframe 302 consists of a number of subzones and interlaces of 48 Physical Layer super-frames. Information about physical location of logical channels is obtained from an associated Broadcast Overhead Channel. This can be obtained by having the access network map the Broadcast Overhead Channel into the Forward Broadcast and Multicast Services Channel. Generally, the Forward Broadcast and Multicast Services Channel carries packets containing content generated by a content server and/or forward link signaling messages. The Forward Broadcast and Multicast Services Channel comprises Broadcast Physical Channels and Broadcast Logical Channels. Broadcast-Multicast Flows (also called BCMCS Flows) as well as the signaling messages destined to the Forward Broadcast and Multicast Services Channel are associated with Broadcast Logical Channels and are transmitted over Broadcast Physical Channels (which may comprise several sub channels).

Up to four Broadcast Overhead Channels are allowed per ultraframe as specified by NumBOC. Thus, as a means of illustration and not limitation, the figure shows four Broadcast Overhead Channels 304 transmitted on the ultraframe 302. The set of Physical channels that each Broadcast Overhead Channel addresses is denoted by a SubbandGroupi, where i can take on values from 0 to 3. The Broadcast Overhead Channels transmitted on ultraframe k contain information about the logical channels transmitted on ultraframe k+1. Each SubbandGroupi can be partitioned into as many outerframes based on the number of outerframes per each ultraframe associated with the SubbandGroupi. This is given by NumOuterframesPerUltraframei, where NumOuterframesPerUltraframei can take values 1, 2, 4, or 8. As a means of illustration and not limitation, the SubbandGroup0 in the figure is partitioned into four outer frames (Outerframe 1-Outerframe 4) and hence NumOuterframesPerUltraframe0 is four. Accordingly, other subband groups may be divided into 1, 2, 4, or 8 outer frames based on respective value of NumOuterframesPerUltraframe parameter. It can be appreciated that the number of subband groups is mentioned herein as a means of illustration and not limitation, and that other numbers can be used in accordance with other embodiments.

Each logical channel in an ultraframe is transmitted once every outerframe associated with the SubbandGroupi. Accordingly, each logical channel in an ultraframe can be transmitted 1, 2, 4 or 8 times depending on the number of outerframes in an ultraframe associated with the SubbandGroupi. The smallest assignable unit is one sub-band over one interlace. This assignment is conveyed over the forward primary broadcast control channel (F-PBCCH). However, at least one subband on each interlace is not assigned for broadcast multicast transmission. This subband carries control signaling used for reverse link transmissions.

Figure 3B:
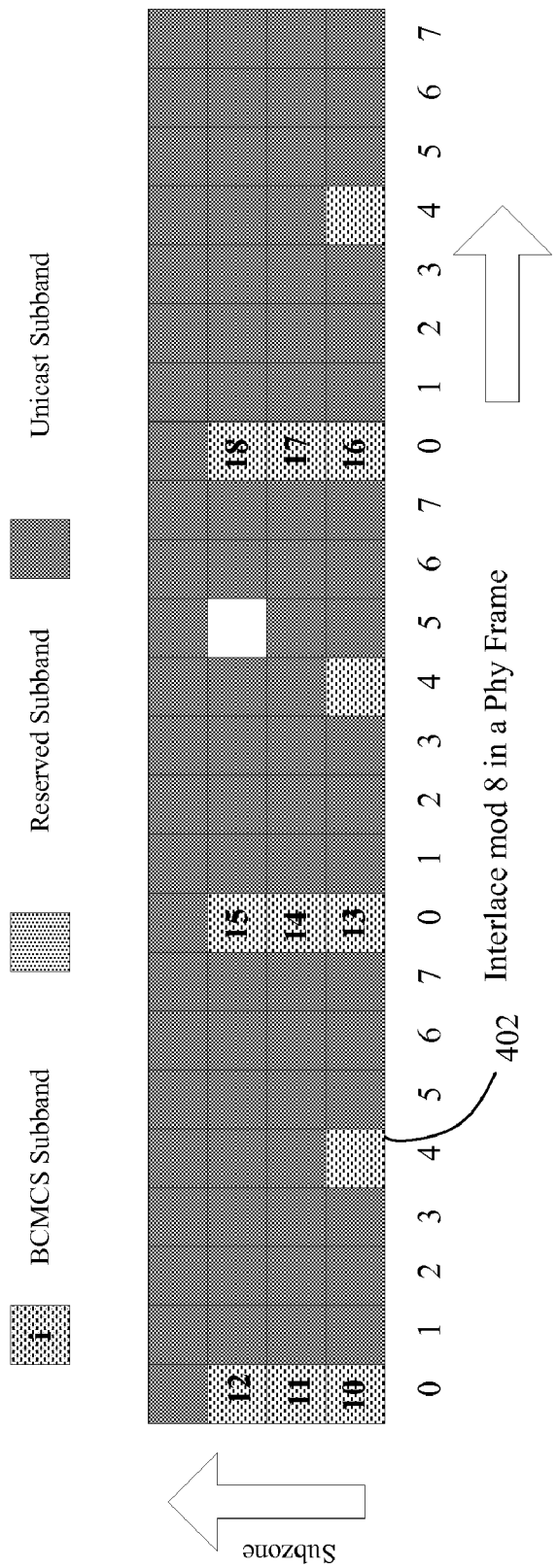
FIG. 3B relates to indexing of BCMCS transmissions in terms of ultraframes in accordance with an aspect.

FIG. 3B relates to indexing of BCMCS transmissions in terms of ultraframes in accordance with an aspect. In particular, it is a schematic diagram of ultraframe (which can be a 1 second structure) of the Forward Broadcast and Multicast Services Channel. Over each Physical Layer frame, each group of 128 hop ports that is part of the Broadcast and Multicast services is referred to as a BCMCS subband. The location of these BCMCS subbands is advertised in the BroadcastParameters message. It may be noted that some of these hop ports may map to guard carriers, and hence cannot be used for data transmission.

In each ultraframe, the BCMCS subbands indexed by UltraframeSubbandIndex are numbered from 0 to NumSubbandsPerUltraframe−1. For example, the four BCMCS subbands within the utraframe 302 of FIG. 3A are numbered 0-3 wherein NumSubbandsPerUltraframe is 4. The PHY frames on which BCMCS is permitted can be numbered in increasing order with the PHY frame that occurs earlier in time being numbered lower. If more than one BCMCS subband is present in a PHY frame, then each of the subbands are numbered in increasing order.

As mentioned supra, FIG. 3B shows a 5 MHz deployment with each BCMCS subband (represented as a box) being 128 hop ports over one PHY Frame. In FIG. 3B, the reserved subbands are represented by lightly shaded boxes, while the subbands reserved for BCMCS are lightly shaded boxes with an index. In the figure, four subbands are reserved per eight interlaces, of which three are assigned to BCMCS. Accordingly, 10, 11, 12, 4 are reserved subbands of which 10, 11, 12 are subbands reserved for BCMCS in the first eight interlaces of the PHY frame shown in the figure and a lightly shaded box without index 402, is a reserved subband, however it is not reserved for BCMCS. This index associated with BCMCS reserved subbands is referred to as the UltraframeSubbandIndex.

Therefore, each SubbandGroupi is comprises a collection of BCMCS subbands such that the $i^{th}$ SubbandGroup is denoted by SubbandGroupi, where i can take on values from 0 to 3. The BCMCS subbands in SubbandGroupi are denoted by NumSubbandsPerGroupi, where NumSubbandsPerGroupi is a multiple of NumOuterframesPerUltraframei. Accordingly, referring to FIG. 3A, the number of BCMCS subbands for SubbandGroup0 is a multiple of four as the NumOuterframesPerUltraframe0 is four. As a means of illustration and not limitation, assuming that SubbandGroup0 comprises a collection of eight BCMCS subbands then NumSubbandsPerGroup0 will be eight and NumOuterframeSubbandsPerGroup0 will be two. Thus, $$NumSubbandsPerGroupi = x \cdot NumOuterframesPerUltraframei \quad \text{Eq. (1)}$$

where $x$ is a positive integer.

$$x = NumOuterframeSubbandsPerGroupi = \frac{NumSubbandsPerGroupi}{NumOuterframesPerUltraFramei} \quad \text{Eq. (2)}$$

These BCMCS subbands per Physical Layer group can be numbered sequentially (in increasing order of the BCMCS subband number) from 0 to NumOuterframeSubbandsPer- Groupi−1 for each of the SubbandGroupi corresponding to each outerframe belonging to the SubbandGroupi. Accordingly, as illustrated in FIG. 3A each of the outerframes (Outerframe 1-Outerframe 4) will be associated with a Subband 0 and a Subband 1. The pair (OuterframeIndexi, SubbandIndexi) thus has a one-to-one mapping with UltraframeSubbandIndex. Each such BCMCS subband is denoted as NumSubbandsPerGroupi which is chosen to be a multiple of NumOuterframesPerUltraframei.

Within each SubbandGroupi, the BCMCS Subbands assigned to each outerframe are determined by the following pair(s): Offsetj and Periodj. Let k denote the index of BCMCS subband in an outerframe. Every BCMCS subband such that k≡Offsetj (mod Periodj) can be part of SubbandGroupi. Therefore, a SubbandGroupi can consist of a number of such (Offsetj, Periodj) pairs as defined by NumOffsetsPerGroupi for j=0, 1, . . . , 15. This can lead to certain unused BCMCS subbands at the end of the superframe, as NumOuterframeSubbandsPerGroupi is a factor of NumSubbandsPerGroupi. A given (Offsetj, Periodj) pair can belong to multiple Physical Channel Groups. In this case, the BroadcastMapping message (BMM) of multiple Physical layer Groups can address the same logical channel. This scenario is useful when the SFN (Single Frequency Network) coverage of the logical channel is different from the SFN of the Broadcast Overhead channel. Generally, a BroadcastMapping message is transmitted to a UE in order to provide the terminal with the mapping between logical channels and starting BCMCS subband on the Broadcast and Multicast Services Channel.

SFN transmissions are those in which all sectors in a broadcast coverage area synchronize their broadcast transmissions and transmit the same wave form during time intervals allocated to the Broadcast Physical Layer packets. All transmissions from participating sectors received at an AT's antenna are combined to appear as a single transmission that goes through a multipath channel with possibly large delay spread between the first and the last arriving paths.

FIG. 4A is a schematic diagram of an embodiment of a signaling message conveying information regarding broadcast parameters to UEs transmitted in accordance with an aspect. In order for the access terminal to discover and monitor broadcast content successfully, various broadcast-related parameters need to be signaled over the air interface via the parameters signaling message. The access network broadcasts use these parameters communicated over the control channel in the form of BroadcastParameters (BPM) in accordance with a particular aspect. UTs that are receiving broadcast content monitor the parameters message while other terminals can ignore it. Each Forward Broadcast and Multicast Services Channel comprises a number of BCMCS subbands as specified in the BPM and mapped to logical channels as described supra. A logical channel can carry Broadcast PCP (Probe Control Protocol) packets from one or more BCMCS Flows. While the same BCMCS Flow may be transmitted independently on several logical channels, the contents of a given BCMCS Flow may or may not be split across multiple logical channels in accordance with different embodiments. If a BCMCS Flow is carried on more than one logical channel belonging to different sectors, the BCMCS Flow to physical channel mapping need not be the same on all those sectors. Logical channels carrying the same broadcast content must be transmitted synchronously across multiple sectors to facilitate soft combining. A logical channel associated with the Forward Broadcast and Multicast Services Channel can be transmitted synchronously across multiple sectors.

Each sector of an access network can carry up to a maximum of four Broadcast Overhead Channels as defined by the NumBOC parameter of the BroadcastParameters message. The Broadcast Overhead Channel is sent on the last one, two, four or eight OFDM symbols of each outerframe of a SubbandGroup. The modulation parameters of the Broadcast Overhead Channel are carried in the BroadcastParameters message. In addition to the Broadcast Overhead Channel, each logical channel also carries in band information about its location in the next ultraframe as further detailed infra. The BroadcastParameters message is transmitted by a sector that contains the logical to physical channel mapping information for that sector. The access network transmits the BroadcastParameters message with the broadcast MACID (Media Access Control ID) as a unicast message over every superframe j such that j mod $N_{BCIPeriod} = N_{BCIPeriod} - 1$ wherein $N_{BCIPeriod}$ is the period of repetition of the message that transmits BroadcastParameters. The location of this message can be between the PHY Frames 2 and 7 inclusive of the corresponding superframe. Following is a more detailed description of the fields within the BroadcastParameters message. It may be appreciated that this description is by the way of illustration and not limitation and that more or less fields can be used in the message in different embodiments.

MessageID: The access network sets this field to OxOO.

ProtocolSubtype: The access network sets this field to the constant.

BroadcastParametersSignature: The access network can change this field if any of the other fields in the BroadcastParameters message change.

CompleteListInd: The access network sets this field to '1' if this message includes all available BCMC flows, else, it sets this field to '0'.

QCISignature: The access network sets this field to the QCISignature public data of the mapping messages protocol.

AllReservedInterlaces: The access network sets this field to '1' to indicate that all the subbands of all the reserved interlaces are being used for BCMCS, else the access network can set this field to '0'.

BCMCSReservedInterlaces: If the AllReservedInterlace field is set to '1', then the access network omits this field otherwise, the access network includes this field and sets its value as shown in the tabular form of FIG. 4B. All the subbands in these interlaces are used for BCMCS.

NumBOC: The access network sets this field to indicate the number of different Broadcast Overhead Channels (and hence Physical Channel groups) present in each BCMCS ultraframe.

BCMCSFlowIDLength: The access network can set this field to one less than the length of the BCMCS Flow Identifier in units of octets. The access network may not set this field to '00'.

BCMCSOverheadFields: The access network includes this field if the BCMCSOverheadFieldsIncluded field is included and set to '1' else, this field is omitted. This field specifies the logical to physical channel mapping for the logical channels transmitted on the Forward Broadcast and Multicast Services Channel.

Reserved: The access network can add reserved bits in order to make the length of the entire message equal to an integer number of octets. The access network sets these bits to '0'. The access terminal can ignore these bits.

Figure 5:
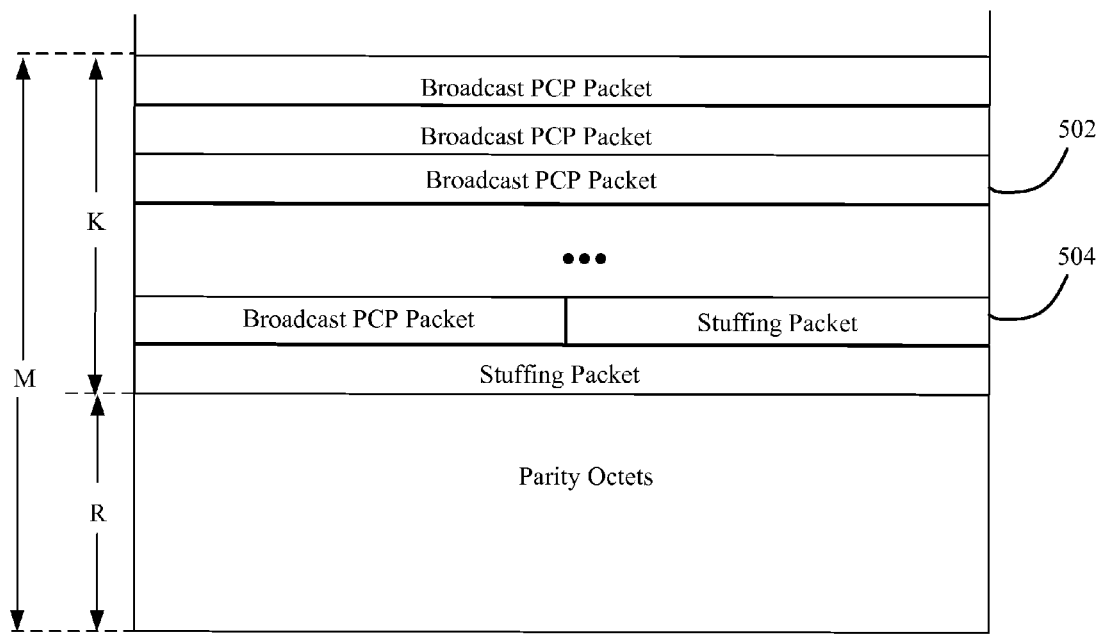
FIG. 5 illustrates a schematic figure of a structure for an error control block in accordance with an aspect.

FIG. 5 illustrates a schematic figure of a structure for an error control block in accordance with an aspect. The Broadcast MAC Protocol contains the rules governing the operation and the timing of the Forward Broadcast and Multicast Services Channel. This protocol serves the Broadcast Security Protocol as well as the Security Layer. The Broadcast MAC Protocol receives Broadcast PCP packets 502 from the Broadcast Security Protocol. Each packet received from the Broadcast Security Protocol is destined for one Broadcast Logical Channel. The Broadcast MAC Protocol forms an error control block by adding an outer Reed-Solomon code to the payload destined for the logical channel. The access network segments the transmission on a logical channel into error control blocks (ECB). Each error control block can begin with zero or one MAC packet received by the BCMCS MAC.

The access network then fills data into the error control block in rows and applies Reed-Solomon coding along columns of the error control block. Subsequently, the error control block is transmitted on the Forward Broadcast and Multicast Services Channel in rows by the network. Thus, each Error Control block contains M rows and MACPacketSize columns. The top K rows of the error control block contain payload from the served protocols or stuffing packets. The bottom R=M−K rows of the error control block contain Reed-Solomon parity octets. The length of each Reed-Solomon code word can be N octets. Each error control block can comprise one Reed-Solomon code word wherein N=Number of octets in a Reed-Solomon code word, K=Number of data octets in a Reed-Solomon code word and R=N−K=Number of parity octets in a Reed-Solomon code word.

Each row of the error control block forms the payload for one or more Broadcast MAC packets. A logical channel utilizes error control blocks with the same values of M, K, and MACPacketSize on all sectors so that the access terminal is allowed to soft combine the logical channel. Thus, an error control block as seen in the figure is formed of M rows and MACPacketSize columns. As stated supra, the top K rows of the error control block contain payload from the served protocols, some of which can be Stuffing Packets 504. These packets can contain an all zero payload and are generally not passed to the Physical layer, and are hence not transmitted over the air.

As described supra, data from the error control blocks is transmitted using Broadcast MAC packets. Each row of an error control block is carried using MACPacketSize-bit Broadcast MAC packets. Stuffing packet may be appended to make the number of data packets equal to K if not enough data is available to fill up the K rows.

Figure 6A:
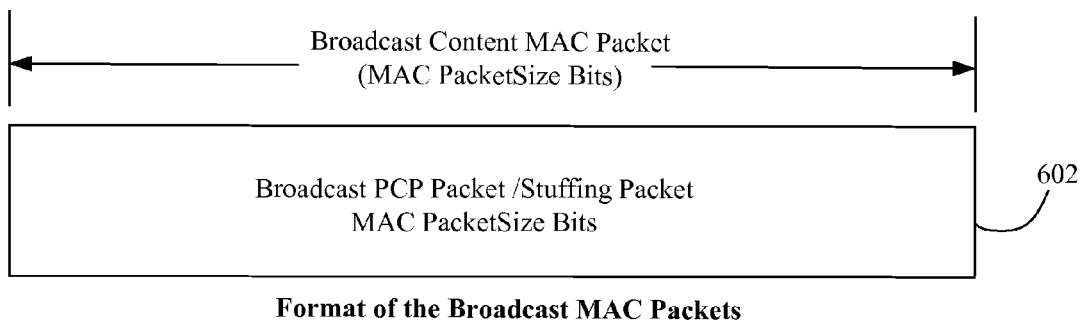
FIG. 6A illustrates the format of broadcast MAC packets in accordance with an aspect.
Figure 6A:
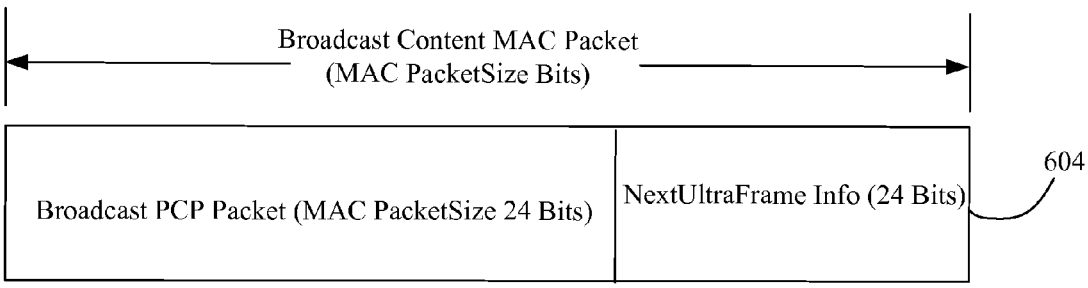

The protocol data unit for the Broadcast MAC Protocol is a Broadcast MAC packet. In addition to Broadcast Overhead Channel, each logical channel also carries in band information about its location in the next ultraframe. This can be done by having the access network append this information as detailed infra to each Broadcast MAC packet. For example, a 17-bit NextUltraFrameInfo bearing this information can be appended to the Broadcast MAC packets. FIG. 6A illustrates the format of other Broadcast MAC packets in accordance with an aspect. In this figure, 602 illustrates the format of other Broadcast MAC packets except the last non-stuffing packet, this non-stuffing packet is shown as 604. FIG. 6B shows a tabular form of the details of the MAC packet containing the trailer NextUltraframeInfo as discussed herein. The access network places the following fields at the end of every Broadcast MAC packet. It may be appreciated that this description is by the way of illustration and not limitation and that more or less fields can be used in the message in accordance with different embodiments.

StartBCMCSSubbandNumber The access network sets this field to the location of the first BCMCS subband of the logical channel in the next ultraframe. If the logical channel is not present in the next ultraframe, the access network sets this field to NULL.

EndBCMCSSubbandNumber The access network can set this field to the location of the last BCMCS subband of the logical channel in the next ultraframe. If the logical channel is not present in the next ultraframe, the access network sets this field to NULL.

Read BroadcastParameters The access network sets this field to '0' if the parameters broadcast on the BroadcastParameters message have not changed. The access network sets this field to '1' if the parameters broadcast on the BroadcastParameters message shall change on the next instance of the BroadcastParameters.

Reserved The access network sets these bits to '0'.

Figure 7:
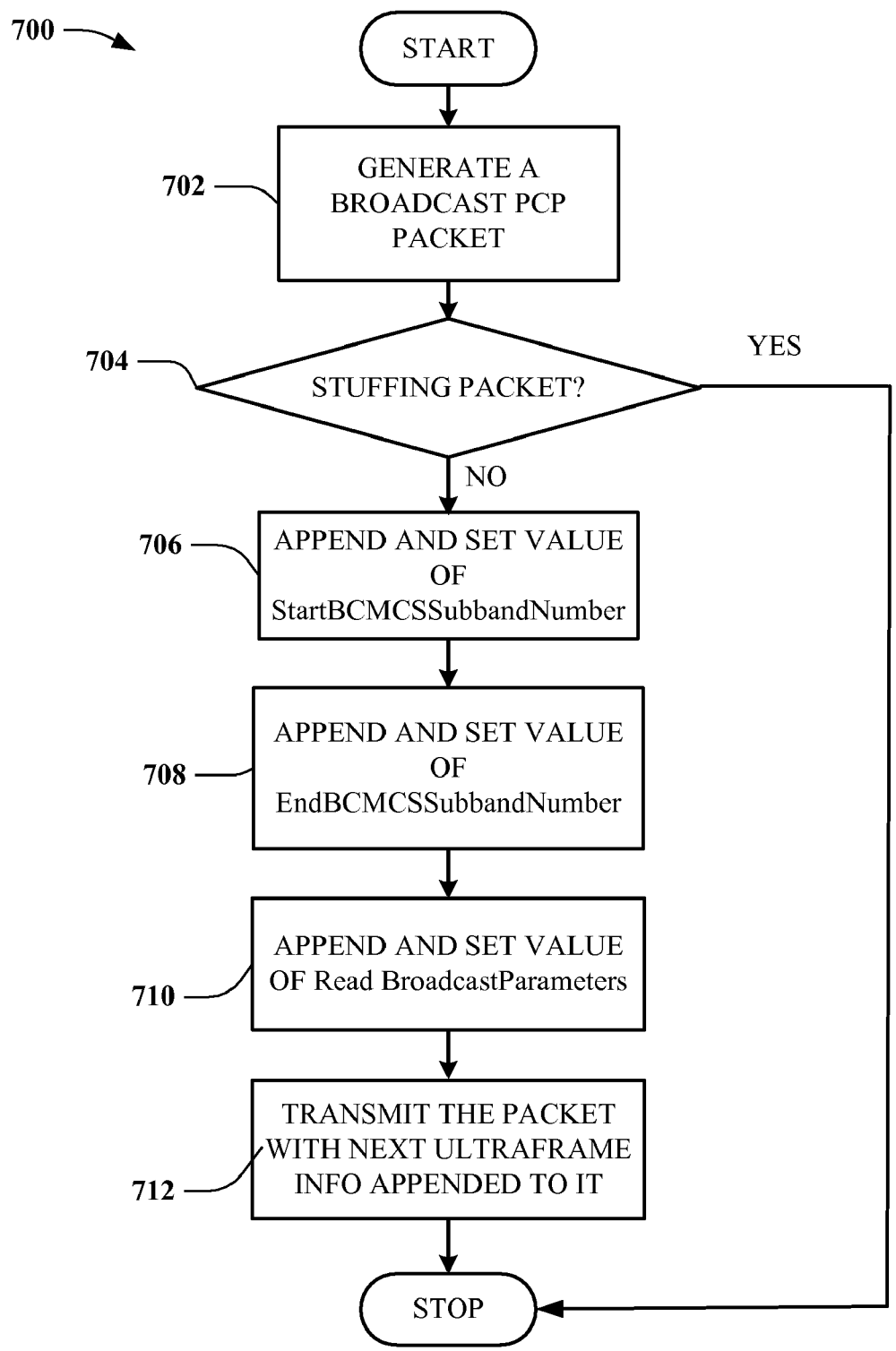
FIG. 7 is a flow chart of a methodology of transmission of Broadcast PCP packets in a manner that saves battery life of UEs.

FIG. 7 is a flow chart 700 of a methodology of transmission of Broadcast PCP packets in a manner that saves battery life of UEs. This method involves appending information about next ultraframe in the current ultraframe so that a UE can determine whether it should receive the next packet or if it can continue in sleep mode in order to save its battery life. Initially, at 702 a Broadcast PCP packet is generated by the access network. If the PCP packet is not a stuffing packet as determined at 704, the access network appends NextUltraFrameInfo as further detailed infra at the end of the packet else the procedure terminates at the end block. Thus, the procedure moves to 706 if the packet is not a stuffing packet and the access network appends StartBCMCSSubbandNumber with its value set based on the location of the first BCMCS subband of the logical channel in the next ultraframe. If the logical channel is not present in the next ultraframe, the access network sets this field to NULL. At 708, the access network appends EndBCMCSSubbandNumber wherein its value is set in accordance with the location of the last BCMCS subband of the logical channel in the next ultraframe. If the logical channel is not present in the next ultraframe, the access network sets this field to NULL. The access network also appends another parameter namely, Read BroadcastParameters at the end of the non-stuffing Broadcast PCP packet as shown at 710 and sets its value to '0' if the parameters broadcast on the BroadcastParameters message have not changed. The access network can set this field to '1' if the parameters broadcast on the BroadcastParameters message shall change on the next instance of BroadcastParameters message. Finally, at 712 the Broadcast PCP packet with the next ultraframe information appended to it is transmitted. Thus, the access network can signal to a UE in the currently transmitted ultraframe about change in parameters associated with the next ultraframe thereby saving UE battery life.

Figure 8:
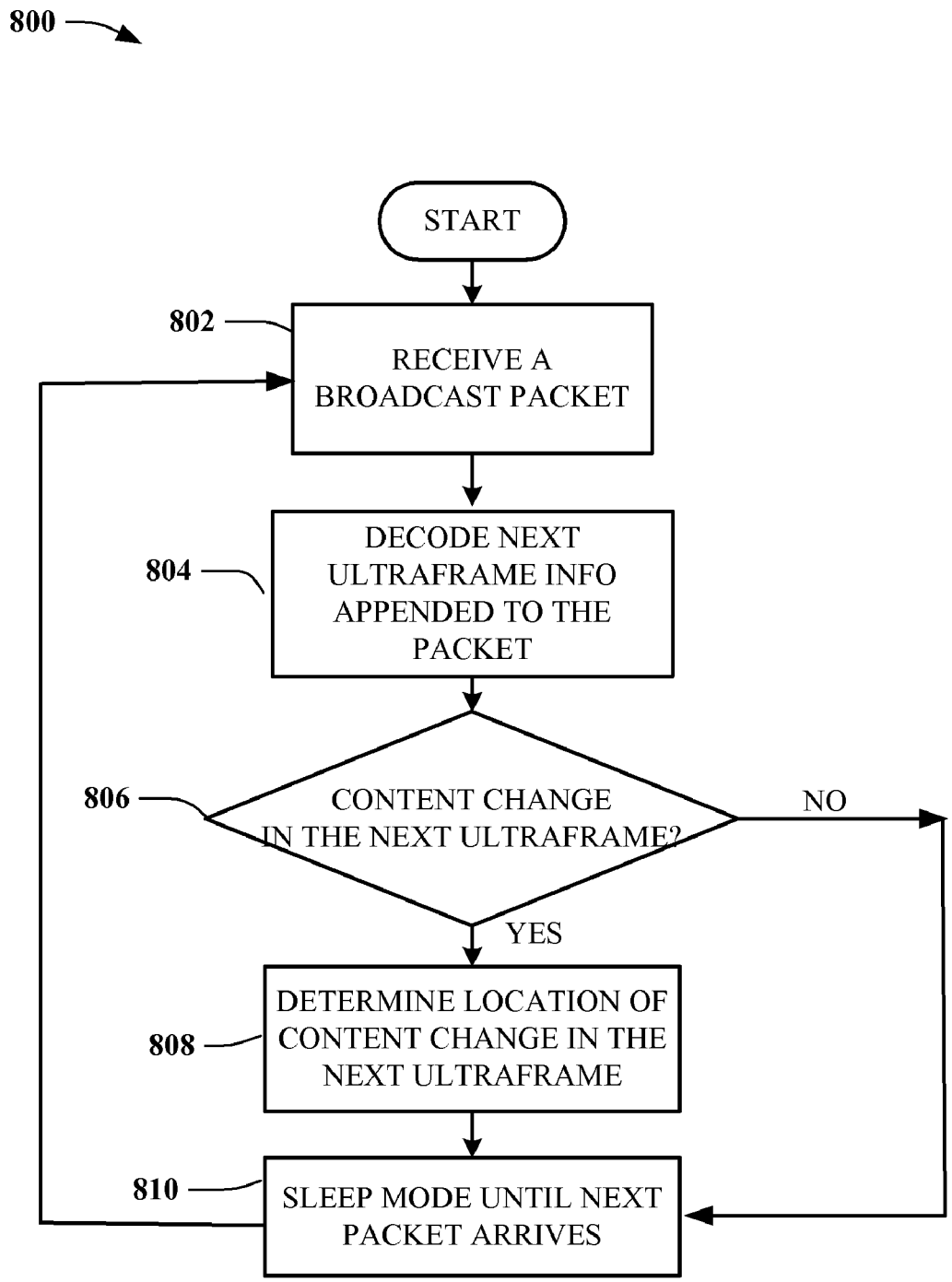
FIG. 8 relates to a method of saving battery life of a UE based on contents of a received Broadcast PCP packet.

FIG. 8 relates to a method 800 of saving battery life of a UE based on contents of a received Broadcast PCP packet. At 802, a UE wakes up from sleep mode to receive broadcast packets being transmitted by an access network. At 804, information regarding a next ultraframe appended to the end of the received packets is decoded. For example, a 17-bit NextUltraFrameInfo field can be appended to a Broadcast PCP packet in accordance with an embodiment. Based on the decoded parameter values it is determined if the content within the next ultraframe that is to be received at the UE will change as shown at 806. In accordance with a further aspect, the ReadBroadcastParameters parameter value is examined to make this determination. If this parameter has a value of '0' then it is determined that the parameters broadcast on the BroadcastParameters message have not changed and hence the method proceeds to 810 wherein the UE returns to sleep mode until the next packet arrives. If the ReadBroadcastParameters parameter value is '1' then it is determined that the content in the next ultraframe will change and the UE examines other appended parameters such as StartBCMCSSubbandNumber or EndBCMCSSubbandNumber to determine the location of content change in the next ultraframe as shown at 808 and then the UE returns to sleep mode until the next ultraframe arrives as shown at 810. Thus, the UE can save battery life by determining from a received Broadcast PCP packet if there is a change in the content within the next ultraframe.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of transmitting broadcast content in a wireless communication system comprising:
    indexing one or more broadcast transmissions as one or more ultraframes;
    providing information regarding physical location of one or more logical channels within the broadcast transmissions;
    classifying a plurality of physical channels employed for transmitting the broadcasts into at least a subband group;
    partitioning the subband group into one or more outerframes; and
    transmitting the one or more outerframes with one or more subbands associated therewith.

2. The method of claim 1, further comprising transmitting a parameters signaling message to advertise the location of the logical channels.

3. The method of claim 1, further comprising transmitting the logical channels once for every outerframe associated with a specific subband group.

4. The method of claim 1, further comprising segmenting transmission on a logical channel into one or more error control blocks (ECBs) beginning with zero or one MAC packet received by a MAC layer.

5. The method of claim 4, segmenting transmission into the one or more ECBs comprises, filling in data into the one or more error control blocks, applying Reed-Salomon coding along columns of the error control blocks and broadcasting the error control blocks in one or more rows on a forward link.

6. The method of claim 1, further comprising providing a UE with the mapping between the logical channels and a starting subband by sending a mapping message to the UE.

7. The method of claim 6, wherein the mapping message of multiple Physical Layer groups addresses a single logical channel when SFN (Single Frequency Network) coverage of the subband group is different from SFN coverage of the single logical channel.

8. The method of claim 1, further comprising providing information regarding logical channels transmitted on ultraframe k+1 within one or more subband groups transmitted on ultraframe k where k is a positive integer.

9. The method of claim 8, providing information regarding the ultraframe k+1 within the ultraframe k comprises appending one or more parameters at end of a broadcast packet transmitted on the ultraframe k.

10. The method of claim 9, the broadcast packet is a non-stuffing packet.

11. The method of claim 9, wherein the one or more appended parameters comprise one or more of StartBCMCSSubbandNumber, EndBCMCSSubbandNumber or Read BroadcastParameters parameters.

12. The method of claim 11, indicating to a receiving access terminal whether one or more parameters associated with a next instance of a parameters message have changed by appending at least the Read BroadcastParameters parameter to the broadcast packet.

13. The method of claim 12, setting the Read BroadcastParameters message parameter to a value of '1' to indicate a change in the next instance of the BroadcastParameters message parameters else setting the value of the Read BroadcastParameters message parameter to '0' to indicate no change.

14. A non-transitory computer readable medium having stored thereon computer executable instructions for carrying out the following acts:
    indexing one or more broadcast transmissions as one or more ultraframes;
    providing information regarding physical location of one or more logical channels within the broadcast transmissions;
    classifying a plurality of physical channels into a subband group;
    partitioning the subband group into one or more outerframes; and
    transmitting the one or more outerframes with one or more subbands associated therewith.

15. The computer readable medium of claim 14, further comprising instructions for advertising the location of the logical channels by transmitting a parameters message to at least a UE.

16. The computer readable medium of claim 14, further comprising instructions for providing a UE with the mapping between the logical channels and a starting subband by sending a mapping message to the UE.

17. The computer readable medium of claim 16, further comprising instructions for transmitting the mapping message associated with multiple Physical Layer groups that addresses a single logical channel when SFN (Single Frequency Network) coverage of at least one of the subbands is different from SFN coverage of the single logical channel.

18. The computer readable medium of claim 14, further comprising instructions for segmenting transmission on a logical channel into one or more error control blocks (ECBs) beginning with zero or one MAC packet received by a MAC layer.

19. The computer readable medium of claim 18, wherein instructions for segmenting transmission into one or more ECB further comprise instructions to fill data into the one or more error control blocks, apply Reed-Salomon coding along columns of the error control blocks and broadcast the error control blocks in rows.

20. The computer readable medium of claim 14, further comprising instructions for providing information regarding logical channels transmitted on ultraframe k+1 within one or more of the subband groups transmitted on ultraframe k where k is a positive integer.

21. The computer readable medium of claim 20, providing information regarding the ultraframe k+1 within the ultraframe k comprises instructions for appending one or more parameters at an end of a broadcast packet.

22. The computer readable medium of claim 21, wherein at least one of StartBCMCSSubbandNumber, EndBCMCSSubbandNumber or ReadBroadcastParameters are the parameters at the end of the broadcast packet.

23. The computer readable medium of claim 21, wherein the broadcast packet is a non-stuffing packet.

24. The computer readable medium of claim 21, wherein the instructions for indicating to a receiving access terminal whether one or more parameters associated with a next instance of the parameters message have changed comprise instructions for appending at least a ReadBroadcastParameters message to the broadcast packet.

25. The computer readable medium of claim 24, comprising instructions for setting the ReadBroadcastParameters message to a value of '1' to indicate a change in the next instance of the parameters message else setting the value of the ReadBroadcastParameters message to '0' to indicate no change.

26. An apparatus for transmitting broadcast content in a wireless communication system, comprising:
a memory;
a processor for executing a set of instructions stored in the memory, the set of instructions for:
indexing one or more broadcast transmissions as one or more ultraframes;
providing information regarding physical location of one or more logical channels within the broadcast transmissions;
classifying a plurality of physical channels employed for transmitting the broadcasts into at least a subband group;
partitioning the subband group into one or more outerframes; and
a transmitter for transmitting the one or more outerframes with one or more subbands associated therewith.

27. An apparatus for transmitting broadcast content in a wireless communication system, comprising:
means for indexing one or more broadcast transmissions as one or more ultraframes;
means for providing information regarding physical location of one or more logical channels within the broadcast transmissions;
means for classifying a plurality of physical channels employed for transmitting the broadcasts into at least a subband group;
means for partitioning the subband group into one or more outerframes; and means for transmitting the one or more outerframes with one or more subbands associated therewith.

* * * * *